United States Patent Office 2,697,714
Patented Dec. 21, 1954

2,697,714

PRODUCTION OF TETRAMETHYLOL GLYCOLURIL

Henry Gaines Goodman, Pittsburgh, Pa., assignor to Union Carbide and Carbon Corporation, a corporation of New York No Drawing. Application September 10, 1952, Serial No. 308,948

8 Claims. (Cl. 260—309.7)

This invention relates to an improvement in the production of tetramethylol glycoluril, whereby it is produced in a much purer and more colorless state.

The preparation of tetramethylol glycoluril, well known in the art, is accomplished by combining formaldehyde with glycoluril in alkaline solution. The mixture is then evaporated under reduced pressure and crude tetramethylol glycoluril, containing impurities and having an undesirable color, crystallizes out.

For example, four mol equivalents of formaldehyde, (or paraformaldehyde), plus 1 to 10 per cent excess, can be charged into a kettle, the pH adjusted to 10 or 12 by the addition of caustic soda or other alkali, one mol equivalent of glycoluril added, and the charge then heated to 40–60° C., whereupon the glycoluril goes into solution. When the glycoluril is completely dissolved, the charge is filtered, if necessary, then evaporated at temperatures up to 60–70° C., and under reduced pressure to 15% moisture, at which point the product will begin to crystallize out. The product is then filtered, and dried in vacuum or with hot-air at any convenient temperature.

When the above procedure is followed, the product crystallizing from an 85% concentrate (15% moisture) retains the moisture, which is extremely difficult, if not impossible, to remove by filtration. As a result, the product dries to a hard, amorphous-like mass, retaining extraneous materials, such as resins, excess formaldehyde, etc., and the mass thus formed is very difficult to produce to fine particles. Furthermore, it possesses more color than is desired.

Attempts have been made to purify the product by recrystallization from the usual organic solvents, but these attempts have proved impractical due to the very low yield of recrystallized product obtained, as shown by the following experiment. One hundred grams of crude tetramethylol glycoluril, obtained by the usual process outlined above, was suspended in five hundred ml. of methanol, and refluxed for 30 minutes with continual stirring. At the end of this time, complete solution of the solid had not occurred, and additional methanol was added until the solid matter had completely dissolved. A total of 1150 ml. of methanol was thus required. Upon cooling to 30° C., crystallization occurred, yielding only 31 grams of product. Upon standing overnight, an additional 14 grams were recovered. Thus the yield from recrystallization was 45%. The yield of crude product in the original process was 73%, normal for the process, so the overall yield of final product was 73×0.45 or only 33% of the theoretical.

I have discovered, however, that tetramethylol glycoluril may be obtained in good yield, in the form of free-flowing crystals, substantially free of extraneous matter, and of a very light color, by the practice of my invention in the following manner. The regular method of preparation is employed up to the point where the charge is evaporated under pressure to the point of crystallization, about 10% to 20% moisture, depending in part on the temperature used, a moisture content of 15% being preferable. If the charge is evaporated to less than 15% moisture content, crystallization may suddenly occur. Conversely, a moisture content appreciably greater than 15% will decrease the yield of product undesirably. At this point the thick, viscous syrup would, by the old method, be allowed to crystallize out into the crude and impure product. In my invention, however, before crystallization can begin, there is added to the viscous syrup, with vigorous stirring, one of a selected group of solvents having specific properties. Upon continual stirring of the syrup-solvent mixture, the product, tetramethylol glycoluril, separates as crystals, which may be easily filtered off and dried, yielding a free-flowing, light-colored product.

The essential nature of the solvents which I have discovered to be suitable must be such that the viscous syrup of concentrated tetramethylol glycoluril is entirely miscible in the solvent, but tetramethylol glycoluril alone is relatively insoluble therein. Examples of such solvents are methanol, ethanol, isopropanol, propionic acid, diethylene glycol, and the monoethyl ether of ethylene glycol. The suitable solvents cannot be selected with reference to only one set of similar properties. For instance, one of the requirements of a solvent suitable for the invention is that it should possess great solubility for water. Thus, n-butanol, in which water is soluble only to the limited extent of 20.1% at 20° C., is not suitable. On the other hand, even though a solvent is totally miscible with water it will not necessarily work. For instance, neither acetone nor n-propanol, both of which possess infinite solubility for water, are suitable for use in the invention. In these cases, instead of initial total compatibility with the thick, viscous syrup of tetramethylol glycoluril, a heterogeneous mixture of two layers forms, the syrup layer gradually hardening to an impure, partially colored product.

Therefore, solvents suitable for use in the practice of this invention must possess the following characteristics: They must be soluble in water; they must be miscible with an 85% aqueous solution of crude tetramethylol glycoluril; and they must be relatively poor solvents for pure tetramethylol glycoluril.

The following examples illustrate the invention, but do not limit it:

Example I

Seventy-one grams (0.5 mol) of glycoluril, which had been prepared previously by the known reaction between glyoxal and urea, was added to a stirred suspension of 66 grams (2.2 mols) of paraformaldehyde in 150 grams of water. The pH of the suspension was adjusted to between 10 and 12 by the addition of alkali, and the suspension heated slowly to 50–60° C. The solids went into solution forming a dark amber liquid.

The liquid was filtered to remove a small amount of foreign matter, then concentrated under reduced pressure at 60–70° C. until it contained 15 percent of remaining water. Without allowing the syrup to cool to a temperature which would induce crystallization, 300 ml. of methanol was added, with vigorous stirring. The syrup went into solution and within a few minutes tetramethylol glycoluril separated as finely divided crystals. These were filtered off, washed with 30 ml. of methanol, and dried. 105 grams of relatively pure and colorless crystals of tetramethylol glycoluril, having a melting point of 136°–138° C., were thus obtained. This was a yield of 80 per cent of the theoretical.

Example II

A suspension of 284 grams (2 mols) of glycoluril and 264 grams (8.8 mols) of paraformaldehyde in 524 grams of water was treated as described in Example I. After evaporating under reduced pressure to an 85 per cent syrup, 1200 ml. of 96 per cent ethanol was added with stirring. The crystals which formed were filtered off, washed with 120 ml. of ethanol and dried. 347 grams of relatively pure and colorless crystals of tetramethylol glycoluril were thus obtained, representing a yield of 66 per cent of the theoretical.

Example III

Using the same quantities of reactants and the same procedure as in Example II, an 85 per cent syrup of tetramethylol glycoluril was prepared. There was added 1200 ml. of isopropanol to the syrup, with stirring, and the resulting crystals were filtered off, washed with 120 ml. of isopropanol and dried. 395 grams of relatively pure and colorless crystals of tetramethylol glycoluril were thus obtained, representing a yield of 75 per cent of the theoretical.

Example IV

One hundred forty-two grams (1 mol) of glycoluril and 132 grams (4.4 mols) of paraformaldehyde were reacted in 262 grams of water, as described in the preceding examples. After evaporating to an 85 per cent syrup, 1200 cc. of the monoethyl ether of ethylene glycol was added with vigorous stirring. The syrup was initially totally compatible with the solvent, but within a few minutes crystallization of the product occurred.

The crystals were filtered off, washed with a little acetone to remove residual glycol ether, and dried. 112 grams of relatively pure and colorless crystals of tetramethylol glycoluril, having a melting point of 136°–138° C., were thus obtained. This was a yield of 43 per cent of the theoretical.

Examples of other suitable solvents, are propionic acid and diethylene glycol. A run made with propionic acid gave a yield of 57% by weight while one with diethylene glycol showed a 46% by weight yield of pure tetramethylol glycoluril. Good yields can also be obtained by using mixtures of solvents possessing the necessary properties. For instance, an equal volume mixture of methanol and isopropanol gave a yield of 77% by weight of the theoretical.

I claim:

1. A process for the production of relatively pure and colorless tetramethylol glycoluril comprising reacting formaldehyde with glycoluril in alkaline solution, evaporating the crude reaction mixture under reduced pressure down to, but not through, the point of crystallization of crude tetramethylol glycoluril, then adding a water soluble organic solvent to the concentrate, said solvent having the property that an 85% concentrate of said reaction mixture is compatible with said solvent, but tetramethylol glycoluril is relatively insoluble therein, allowing crystals of tetramethylol glycoluril to crystallize out of solution, and separating said crystals of relatively pure and colorless tetramethylol glycoluril.

2. A process according to claim 1 in which said water soluble organic solvent is selected from the group consisting of methanol, ethanol, isopropanol, the monoethyl ether of ethylene glycol, propionic acid, and diethylene glycol.

3. A process according to claim 1 in which said water soluble organic solvent is methanol.

4. A process according to claim 1 in which said water soluble organic solvent is ethanol.

5. A process according to claim 1 in which said water soluble organic solvent is isopropanol.

6. A process according to claim 1 in which said water soluble organic solvent is diethylene glycol.

7. A process according to claim 1 in which said water soluble organic solvent is propionic acid.

8. A process according to claim 1 in which said water soluble organic solvent is a mixture comprising at least two solvents selected from the group consisting of ethanol, methanol, isopropanol, the monoethyl ether of ethylene glycol, diethylene glycol, and propionic acid.

References Cited in the file of this patent

FOREIGN PATENTS

| Number | Country | Date |
|---|---|---|
| 719,394 | Germany | Mar. 12, 1942 |

OTHER REFERENCES

Annalen, vol. 339, pp. 3–13.